United States Patent [19]

Erdman

[11] Patent Number: 5,517,928
[45] Date of Patent: May 21, 1996

[54] JOINTS FOR TUBULAR-FRAMED MODULAR FURNITURE

[76] Inventor: Anthony E. Erdman, 2304 Pine Heights Dr. N.E., Atlanta, Ga. 30324

[21] Appl. No.: 197,504

[22] Filed: Feb. 16, 1994

[51] Int. Cl.⁶ .................................................. A47B 47/00
[52] U.S. Cl. ........................ 108/180; 108/153; 403/375
[58] Field of Search ............................. 108/180, 192, 108/193, 153; 403/375, 383, 186, 403, 205, 387, 254, 258, 260, 255

[56] References Cited

U.S. PATENT DOCUMENTS

| | | | |
|---|---|---|---|
| 1,606,103 | 11/1926 | Schimmel | 108/153 X |
| 2,346,448 | 4/1944 | Noblitt et al. | 108/153 X |
| 2,674,769 | 4/1954 | Carisi | 403/217 |
| 3,141,423 | 7/1964 | Christensen | 211/188 X |
| 3,259,079 | 7/1966 | Freeman | 108/192 X |
| 3,851,601 | 12/1974 | Davis | 108/192 X |
| 3,932,047 | 1/1976 | Crossan | 403/186 |
| 4,308,802 | 1/1982 | Munz | 108/153 X |
| 4,563,040 | 1/1986 | Alster | 108/153 X |
| 4,892,044 | 1/1990 | Welsch | 108/192 X |

FOREIGN PATENT DOCUMENTS

| | | | |
|---|---|---|---|
| 2584584 | 1/1987 | France | 108/153 |
| 3038539 | 5/1981 | Germany | 108/180 |
| 3507158 | 9/1986 | Germany | 108/180 |

*Primary Examiner*—Peter M. Cuomo
*Assistant Examiner*—Janet M. Wilkens
*Attorney, Agent, or Firm*—Harry I. Leon; Vivian L. Steadman

[57] ABSTRACT

A system of precision, precut joints developed for tubular-framed, modular furniture enabling a user to assemble furniture pieces quickly and easily with the use of ordinary hand tools. In the primary joint of this system, a truncated corner of a horizontal panel or shelf is fastened to a vertically-disposed, grooved section of tubing. Receiving the corner is a groove which is cut in the tubing section transversely to the longitudinal centerline thereof and which has a height slightly greater than the thickness of the shelf or panel. Opposite the groove and midway between opposing distal ends of the groove, the section has a first hole formed therein for receiving a screw threadedly engageable with a second hole formed in the truncated corner. As the screw is tightened, it pulls the truncated corner into the groove, forming a strong joint. For joining together two otherwise stand-alone modular furniture units, a twist-lock joint, which becomes fully engaged as screws in proximate grooved section/truncated corner joints are tightened, is provided. The twist-lock joint comprises tubing part slideably insertable into a connector element. The connector element comprises a pin or indentation which, as the grooved sections are twisted together, rides in a curved channel formed in the swaged tubing part. A further joint in the system utilizes dowel pins inserted into matching closed-end holes formed between vertically- and horizontally-disposed panels. Each dowel pin joint is situated so that tightening the screw in a proximate grooved section/truncated corner joint locks the dowel pin in place.

6 Claims, 6 Drawing Sheets

JOINTS FOR TUBULAR-FRAMED MODULAR FURNITURE

BACKGROUND OF THE INVENTION

The prior art reveals considerable interest over the years in tubular frame tables and storage fixtures. Kompass, in U.S. Pat. No. 2,552,286, which issued in 1951, discloses a table using tubular metal legs fastened, with wood screws, within notches formed in a support structure for the table top to facilitate construction of the table and to enhance its strength.

Tucker, in U.S. Pat. No. 3,173,385, which issued in 1965, provides a shelf assembly using tubular legs in which special fittings are employed to attach the shelves to the tubular frame. Encircling the tubular frame, each fitting is held in place by hoop tension provided by a bolt used as a tensioning device. Tucker's joining method, however, is only suited for hollow shelves such as steel shelves.

SUMMARY OF THE INVENTION

The primary object of the present invention is to provide attractive, strong, low-cost modular furniture which can be quickly and easily assembled, disassembled and reassembled using common tools and which, when disassembled, can be packaged in flat packages of a size readily transportable in standard automobiles. Among the pieces of furniture of interest are various combinations of storage units and work desks of modern appearance. A further object is to provide a storage cabinet that uses only four screws per shelf and that does not utilize any glue, thereby facilitating assembly, disassembly and reassembly of the cabinet.

An additional object is to provide units of modular furniture which can be combined in various ways to meet changing needs.

According to the present invention, each piece of furniture comprises horizontal shelves and the like, each shelf being supported contiguous with the corners thereof by sections of thin-walled, circular metal tubing which, together, comprise a frame. Generally, portions of each section that are contiguous with one of the shelves in the assembled piece define a groove which is disposed transversely to the longitudinal centerline of the tubing from which that particular section is formed. Sized so that the section can be slipped over the edges of the shelf, the groove is approximately as wide as the horizontal shelf is thick. Preferably, the clearance between the horizontal edges of the shelf and the groove is at most a few thousandths of an inch. Moreover, the distal ends of the groove are spaced apart from each other by a distance substantially equal in width to the transverse cross-section of the tubing, so that a part of the shelf having an upper surface area which is about as great as one-half of the transverse cross-section of the tubing can be inserted into the grooved section.

In the assembled form, each of the grooved sections is joined to one of the shelves proximate with a corner of the shelf. To provide for a high level of rigidity in the joints between the sections and the shelves, each corner is truncated in such a way that the corner can be inserted into any one of the grooved sections, past the opposing distal ends of the groove formed therein, and then be wedged against the section. To allow the corner to be so inserted, opposing distal edges of each truncated corner are spaced apart by a distance slightly less than the distance between the opposing ends of the groove. For horizontal shelves which are generally rectangular in plan view, each of the truncated corners is preferably fabricated by cropping the corners of each shelf, as it existed prior to fabrication, at an angle of about 45 degrees to the longitudinal side edges of the finished shelf. Moreover, the size of the corner piece which is cropped depends upon the diameter of the tubing used to support the shelf. When supported by sections of 1¼ inch diameter tubing, for example, each shelf is cropped for a distance of about one-half inch to either side of each of the original corners defined by intersecting, contiguous pairs of longitudinal edges of the shelf.

Means for holding each grooved section and one of the truncated corners in assembled relation comprises a screw, preferably one having a fine, deep thread such as a Confirmat ® one-piece connector or a Unita-Steel connecting screw, insertable into a first hole formed in the section about midway between the opposing distal ends of the groove. The screw is threadedly engageable with walls of a second hole which is formed in the truncated corner about midway between opposing distal edges thereof. When so threadedly engaged, the screw extends perpendicularly to a vertical face of the shelf bounded by said opposing distal edges. The screw, as it is advanced, pulls the truncated corner into the grooved section and, in the process, simultaneously traps and compresses material constituting the substance of the truncated corner. Importantly, when the clearance between the shelf and opposing proximate edges of the groove is kept small, this trapping and compressing of material causes the truncated corner to bulge slightly, pressing the opposing proximate edges of the groove into the shelf. In addition, vertical edges of the truncated corner wedge against the inside wall of the section proximate with the ends of the groove, further strengthening the joint. The combination of a frame section having a deep, close-fitting groove disposed generally at a 45 degree angle to the horizontal edges of the shelf and a Confirmat ® one-piece connector or the like employed to wedge the corner of the shelf within the groove results in a very strong joint even when the shelf is fabricated from chip board or particle board.

Vertically aligning the grooves in a contiguous pair of sections of the thin-walled, circular metal tubing is facilitated by rigidly connecting such sections together utilizing a twist-lock joint. Moreover, tightening each screw holding a contiguous, horizontal shelf in assembled relation with its respective grooved section in said contiguous pair further engages elements of the twist-lock joint, making it impossible to untwist while the horizontal shelves are attached.

In each such twist-lock joint, a first section of tubing has formed therein an indentation, such as a dimple, on an inside wall of the section near one end thereof. Insertable into the first section is a swaged tubing part formed on an end of the second section, the swaged tubing part fitting inside the dimpled end of the first section with close tolerance. Moreover, the swaged tubing part has formed therein a curved channel for receiving the dimple, the dimple riding in the channel as the first and second sections are twisted together. The seating of the dimple within the channel as the contiguous grooved sections are twisted together brings the respective grooves formed therein into proper alignment for receiving horizontal shelves and the like.

In the case of structures having both top and bottom panels serving as horizontal members as well as side panels disposed between these panels and held in assembled relation with them by close-fitting dowel pins, tightening the screws which hold the horizontally-disposed panels in their respective grooved sections can also be used to secure the side panels firmly in position. As each such screw is tightened, the top panel or, alternately, the bottom panel is pulled into its respective grooved section, thereby causing that particular horizontally-disposed panel to move relative to the side panel.

An improved structure utilizing the present invention has both the underside of the top panel and the upperside of the bottom panel provided with holes formed part way therethrough for receiving the closely-fitting dowel pins as do upper and lower ends of the side panels. In assembling the structure, the dowel pins are installed, without the use of glue, in holes that are alignable with each other and which are formed within contiguous portions of the top panel and of the side panel or, alternately, within contiguous portions of the bottom panel and of the side panel. Grooved sections comprising a frame for supporting the structure are then slipped over truncated corners of the top and bottom panels. As each screw securing one of the truncated corners to the grooved section contiguous thereto is tightened, the top panel or, alternately, the bottom panel is partially pulled into the respective grooved section, thereby causing the top panel or, alternately, the bottom panel to move relative to the proximate side panel, to wedge or pinch any proximate dowel pin in the respective holes it occupies in the enclosure, and to press the side panel against the grooved section.

The various joints according to the present invention, including the grooved section/truncated corner joint, whether taken singularly or in combination with the twist-lock joint or the pinched dowel pin joint, can be used to advantage in many different arrangements to make modular furniture. The twist-lock joint is particularly useful for extending vertically-disposed grooved sections in the frame of an existing unit to accommodate additional shelves and the like.

By way of illustration, a composite piece is provided which has an enclosed base cabinet and an open shelf unit in which twist-lock joints are employed to join together vertically-disposed grooved sections in the frames of both the cabinet and shelf unit. In assembling this piece, the components of the frames forming twist-lock joints are slideably engaged first. Next the side panels of the base cabinet are joined to the top and bottom panels of this unit using dowel pins inserted into pairs of holes, alignable with each other, formed in the bottomside of the top panel and in side panels or, alternately, in the upperside of the bottom panel. Then grooved sections of the assembled frame are joined to the top and bottom panels of the base cabinet but without appreciably tightening the screws securing the grooved sections to these panels. Rather, the screws are tightened just enough to keep the base cabinet somewhat stable but still loose enough to allow horizontal shelves to be inserted into grooved sections of the upwardly-disposed open shelf unit. When all of the horizontal shelves have been so inserted, the screws employed to hold the shelves and contiguous grooved sections in assembled relation are tightened. This tightening of the screws not only causes the shelves to be partly pulled into their respective, contiguous grooved sections but also the dowel pins securing the side panels to the top and bottom panels lock in place and the twist-lock joints become fully engaged, thereby greatly stabilizing the composite piece structurally.

The base cabinet and the open shelf unit can also be used as stand-alone furniture pieces. When the base cabinet is utilized separately, a top rail is provided which can be rigidly attached, using twist-lock joints, to the upper ends of the vertically-disposed grooved sections of a frame for the cabinet. So attached, the top rail can be used to lift the cabinet. When the base cabinet is to be used as a mobile cart, supports for casters are inserted into and secured to the bottom ends of the vertically-disposed grooved sections of the frame.

Another piece of tubular-framed modular furniture in which the joints according to the present invention can be utilized to advantage is a work table. For this piece, a rectangular top panel with truncated corners, forming a work surface, is supported by a frame having vertically-disposed grooved sections capped by plugs. In addition, the frame preferably also includes a shear support panel interconnecting two of the vertically-disposed grooved sections.

A modification of the work table includes the addition thereto of a shelf unit mountable above the work surface of the table. To add such a unit, one removes the plugs capping the grooved sections of the table and extends them by interconnecting these sections with other grooved sections and the like provided with mating components to complete twist-lock joints with the grooved sections of the table itself. Once the entire frame for the work table/shelf unit composite piece is complete, horizontal shelves are then inserted into the grooved section and screws holding the corners of the shelves in their respective grooved sections are tightened. Finally, a top rail may be added to the top ends of each proximate pair of vertically-disposed grooved sections to complete the piece.

DETAILED DESCRIPTION OF THE PREFERRED EMBODIMENT

Figure 1:
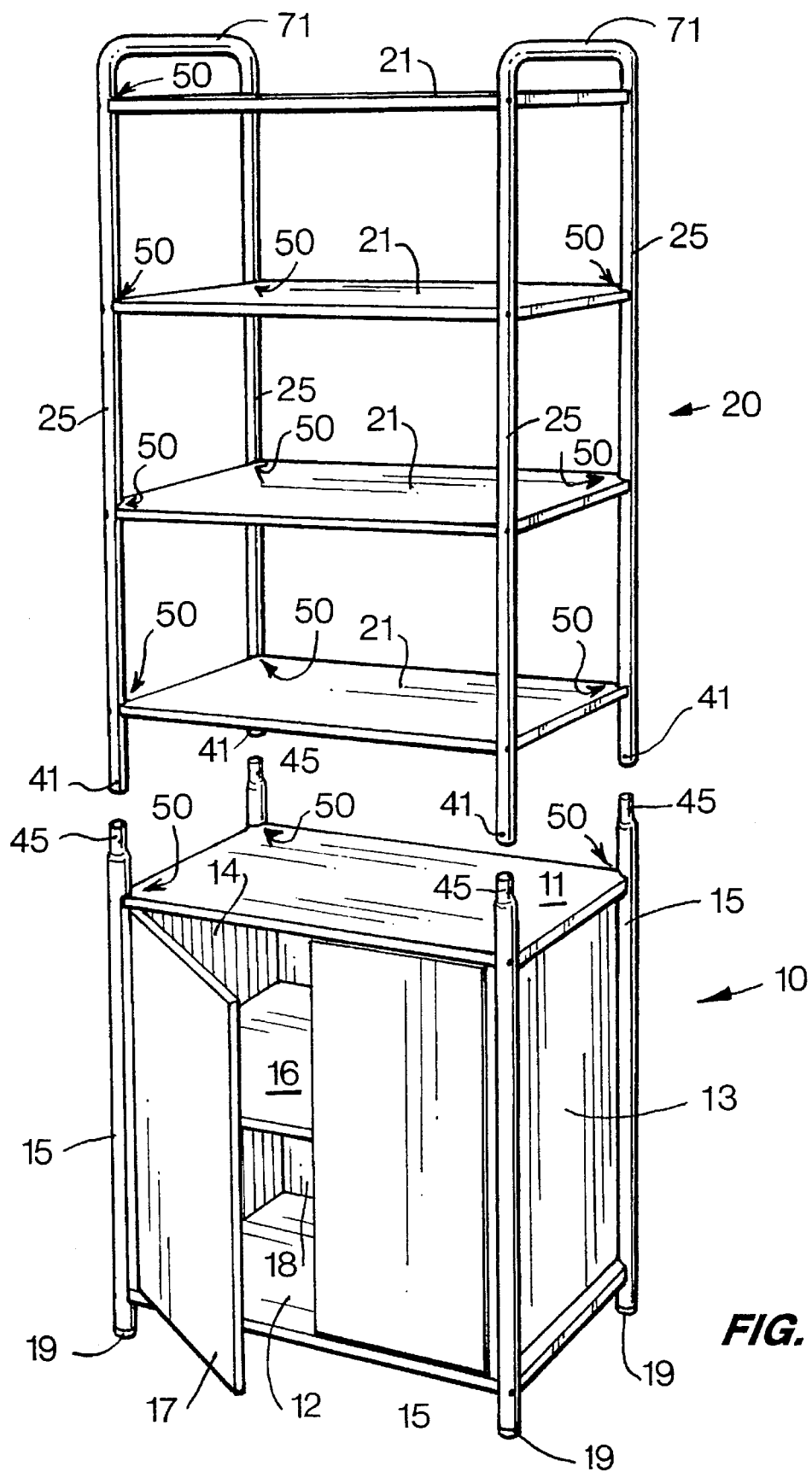
FIG. 1 is an exploded, frontal perspective view of a piece of improved tubular-framed modular furniture including a base cabinet and an open shelf unit in which the cabinet and shelf unit, taken either individually or in combination, exhibit at least one joint according to the present invention.

As illustrated in the drawings, grooved sections 15, 25, 32, 36, 37 of thin-walled metal tubing comprise frames useable with various pieces of tubular-framed modular furniture, including pieces indicated generally by reference numerals 10, 20, 30 (FIGS. 1–4). The frames formed from these grooved sections both directly support horizontally-disposed shelves 21, 35 and panels 11, 12, 31 and indirectly support vertically-disposed side panels 13, 14 connected to panels 11, 12. Tubing from which the grooved sections are fabricated measures, by way of example, 1.25 inch in diameter and has an 18 gage wall thickness.

Portions of each section which is disposed contiguous with one of the shelves 21, 35 or panels 11, 12, 31 in the assembled piece defines a groove disposed transversely to the longitudinal centerline of the respective section 15, 25, 32, 36, 37 in which it is formed. A typical groove 51 so defined is shown in detail in FIGS. 5 and 7. The groove 51 is sized for receiving one of the shelves or panels with a small amount of clearance. Preferably, the shelves 21, 35 and panels 11, 12, 31, whether they be fabricated from plywood, particle board, medium density fiber board, solid wood, or the like, are of the standard thickness of sheets of ⅝ inch or ¾ inch thick plywood stock. Alternately, the shelves and panels can be fabricated from metal or plastic sheets of the same thickness as that preferred for the plywood stock. The clearance of the groove 51 itself is typically no more than 0.010 inch, and preferably only 0.002 inch, greater in height than the thickness of the shelf or panel over whose edges the groove is to be slipped during assembly.

Figure 6:
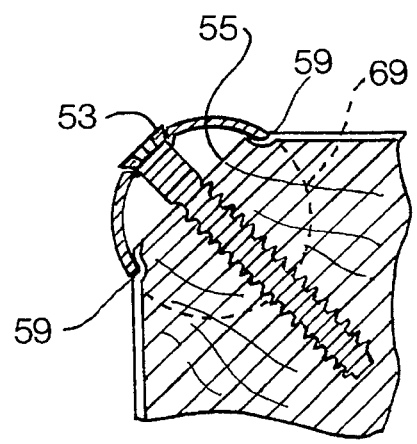
FIG. 6 is a cross-section taken along line 6—6 of FIG. 5.
Figure 10:
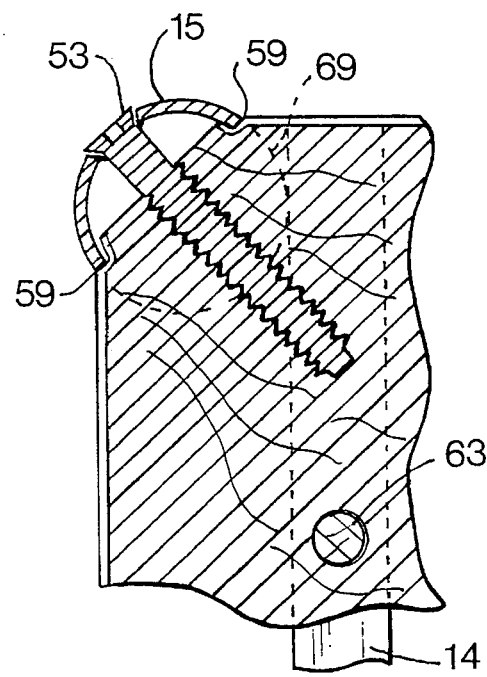
FIG. 10 is a cross-section taken along line 10—10 of FIG. 9.

In the preferred embodiment illustrated in FIGS. 1–4, each grooved section 15, 25, 32, 36, and 37 is rigidly attached to one of the corners of a horizontally-disposed, generally rectangular panel or shelf. The grooved section is mounted in such a way that an imaginary line connecting distal opposing ends of the groove 51 is disposed at an angle of about 45 degrees to longitudinally-extending edges of the panel or shelf (FIGS. 6 and 10). Moreover, each of the shelves or horizontally-disposed panels has truncated corners 55 cropped at an angle of approximately 45 degrees to said longitudinally-extending edges. In general, the size of the corner piece which is cropped depends upon the diameter of the grooved section. For insertion of the shelf or panel corner in a grooved section formed from 1¼ inch diameter tubing, for example, a right triangular piece measuring about one-half inch along two of its sides is cropped. When 1¼ inch tubing is utilized to form the groove section, the groove 55 itself is preferably cut to a length, between opposing distal ends 58, 68, of approximately 0.96 inch with 0.29 inch of the tubing remaining. Similarly, 0.30 inch of the tubing remains wheel 1½ inch tubing is used, giving the length of the groove between opposing distal ends as approximately 1.20 inches.

Figure 5:
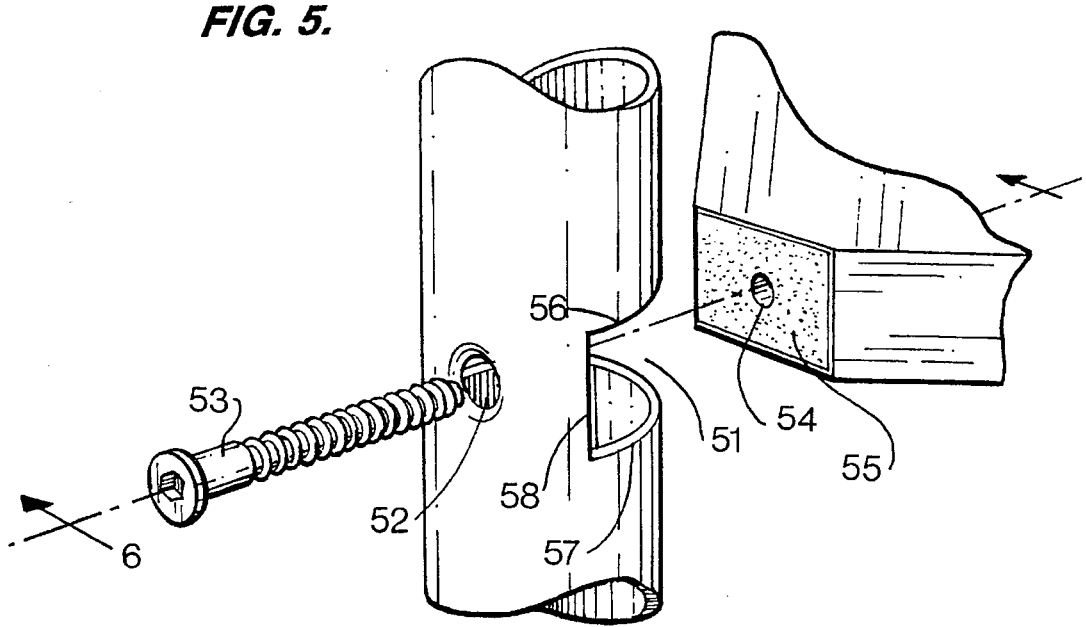
FIG. 5 is an exploded, perspective view of a grooved section/truncated corner joint according to the present invention, only fragmentary portions of the grooved section and of a truncated corner of a horizontal shelf being shown for clarity of illustration.
Figure 7:
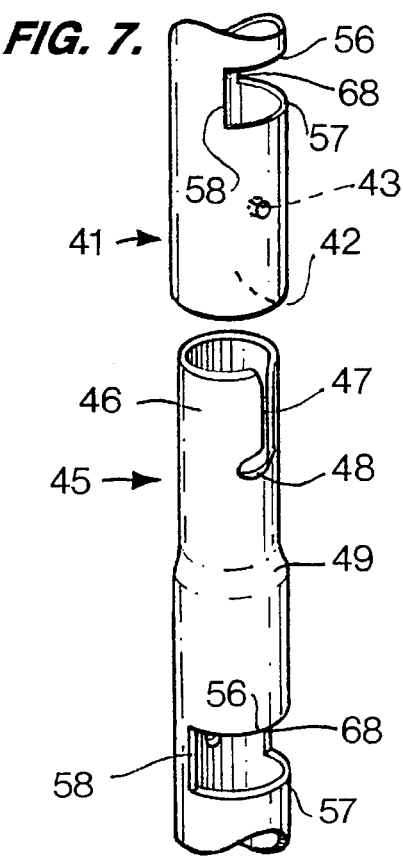
FIG. 7 is a perspective view of fragmentary portions of contiguous vertically-disposed grooved sections showing ends thereof connectable by a twist-lock joint.

Holding each grooved section and one of the truncated corners rigidly together is a screw 53, preferably a Confirmat ® one-piece connector or Unita-Steel connecting screw having a fine, deep thread, measuring one-fourth inch in diameter by 2 inches long, and having a flat head with an interior hex head for allen wrench tightening (FIG. 5, 6, 9, 10). The screw 53, extending through a first hole 52 formed in the grooved section about midway between the opposing distal ends 58, 68 of the groove 51, is threadedly engaged with walls of a second hole 54 formed in the truncated corner 55 about midway between opposing distal edges thereof (FIGS. 5–7). When the screw is turned in the hole 54, the joint between the grooved section and the contiguous shelf or panel is self-centering. Moreover, the hole 54 is sized to allow the shank of the screw 53 to be inserted therein but is smaller than the outer diameter of the threads of the screw 53, so that the grooved section/truncated corner joint, when the screw is seated, exhibits a high degree of holding strength.

In addition, when the clearance between opposing proximate edges 56, 57 of the groove 51 and the shelf or panel is small, the holding strength of the joint is further enhanced by a simultaneous trapping and compressing of the truncated corner 55 which occurs, after the truncated corner has been pulled into the groove and past the opposing distal ends 58, 68 thereof, as the screw 53 is further tightened. In such a situation, the truncated corner 55 swells sufficiently to cause indentations 59, 69 to be formed, respectively, proximate with the distal opposing edges of the corner and across both the upper and lower horizontal surfaces thereof (FIGS. 6 and 10).

Figure 8:
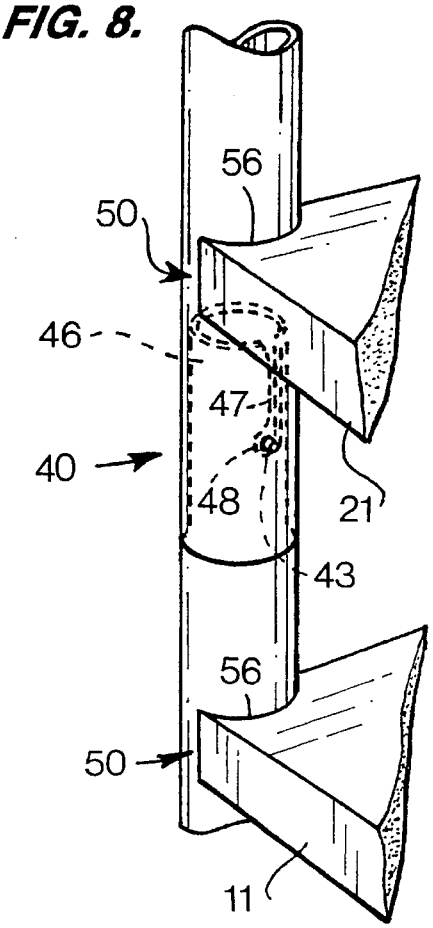
FIG. 8 is a perspective view of the fragmentary portions of contiguous vertically-disposed grooved sections according to FIG. 7 and of fragmentary portions of horizontal shelves attached to the grooved sections, the grooved sections being connected together by a twist-lock joint.

Means for vertically aligning distal ends 58, 68 of grooves 51 in a contiguous pair of sections 15, 25 comprises a twist-lock joint 40 (FIGS. 7 and 8). The joint 40, which is especially useful in putting together two units of tubular-framed modular furniture, such as a base cabinet 10 and an open shelf unit 20 illustrated in FIG. 1, comprises interconnectable elements 41, 45.

In the joint 40, element 41 which terminates in an open end 42 is formed from a grooved section and includes an indentation 43, such as a dimple, which extends inwardly from a wall of this section. Element 45, on the other hand, comprises a swaged tubing part 46 slideably insertable into the open end 42, the part 46 being bounded by a tapered section 49 and having a curved channel 47 defined by the part 46. To interconnect the elements 41, 45, the swaged tubing part 46 is inserted into the open end 42; and elements are twisted relative to each other. During the twisting, the indentation 43 rides in the channel 47 until the indentation reaches the end point 48 thereof; and simultaneously, the edge of the open end 42 abuts the tapered section 49.

Once the twist-lock joint 40 has been formed, the grooves 51 are properly aligned for receiving the truncated corners 55 of shelves and the like. Moreover, tightening screws 53 holding grooved section/truncated corner joints in assembled relation further engages any proximate twist-lock joints 40, strengthening the latter. Thus, screws 53 comprise means for urging the indentation 43 into full engagement with the curved channel 47.

Figure 9:
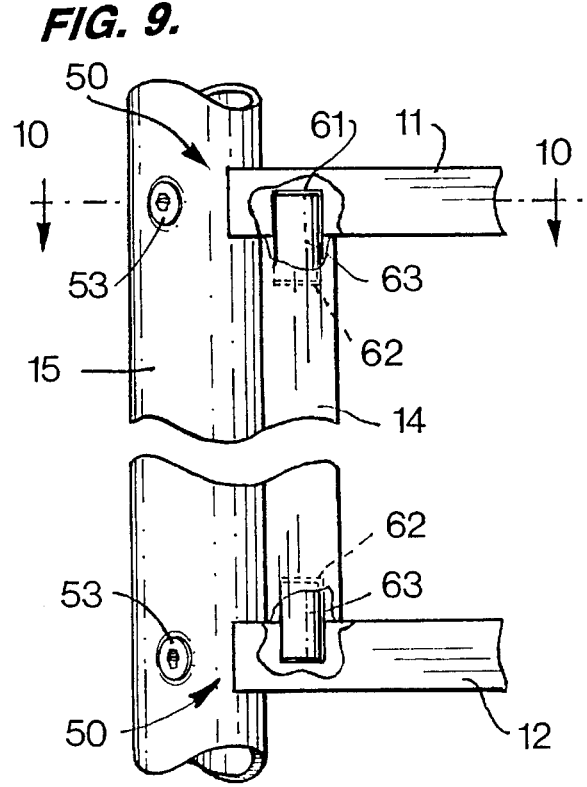
FIG. 9 is an elevation view of a fragmentary portion of a vertically-disposed grooved section supporting top and bottom panels of an enclosed structure such as the base cabinet shown in FIG. 2, a side panel being secured to the top and bottom panels by pinched dowel pin joints; fragmentary portions, as well as cutaway sections, of the top, bottom and side panels being shown for clarity of illustration.

The grooved section/truncated corner joints can also work in combination with dowel pin joints, enhancing their strength. As illustrated in FIGS. 9 and 10, dowel pins 63, held in matching, closed-end holes 61, 62, can be utilized to secure top and bottom panels 11 and 12 to a side panel 14 when the panels 11, 12 are attached to a tubular frame using joints 50. The dowel pins 63, which are close-fitting and used without glue, are installed in the holes 61, 62 to connect the side panel 14 to the top and bottom panels 11, 12 preparatory to attaching the tubular frame. In the process of securing the frame to the panels 11, 12 by tightening screws 53 in the joints 50 of the grooved section, pressure is put on the side panel 14, moving it slightly inwardly relative to the truncated corners 55 of the panels 11, 12. As a result, the dowel pins 63 become wedged or pinched in their respective holes, locking and strengthening the dowel pin joints.

The grooved section/truncated corner joint 50, whether used singly or in combination with either the twist-lock joint 40 or the pinched dowel joint or both, can be used to advantage to form a wide variety of tubular-framed, modular furniture pieces (FIGS. 8–9).

In FIG. 1, a closed base cabinet 10 and open shelf unit 20 are shown as separate units. To assemble this combination, elements 41, 45 on grooved sections 25, 15, respectively, are first interconnected. The interconnections are accomplished with the use of twist-lock joints 40 (FIG. 7–8). Then side panels 13, 14 of the base unit 10 are joined to the top panel 11 and the bottom panel 12 (FIG. 1). As illustrated in FIGS. 9 and 10 for the case of panels 11, 12, and 13, joints between the top, bottom and side panels are formed by using dowel pins 63 inserted into matching holes 61, 62 formed in the bottom side of the panel 11 and in the upper ends of the side panels and in the upper side of the bottom panel 12 and in the lower ends of the side panels respectively. Next, the grooved sections 15 are secured to the panels 11, 12 using joints 50 FIG. 1. By only loosely tightening the screws (not shown) securing the grooved sections 15 to the panels 12, 13 at this point, one can make the combination of units somewhat stable while having them be sufficiently flexible to allow insertion of corners of the shelves 21 into their respective grooves (FIGS. 1 and 5). Once all the shelves 21 have been installed, the screws for all of joints 50 are tightened. Thereupon, not only are the shelves 21 and panels 11, 12 rigidly attached to their respective contiguous grooved sections but also the dowel pins 63 in the base cabinet 10 become locked into their respective holes; and the twist-lock joints 40 interconnecting the cabinet and the shelf unit 20 become fully engaged, making the cabinet/open shelf unit combination into a rigid and highly stable structure (FIGS. 1, 8 and 9).

Figure 2:
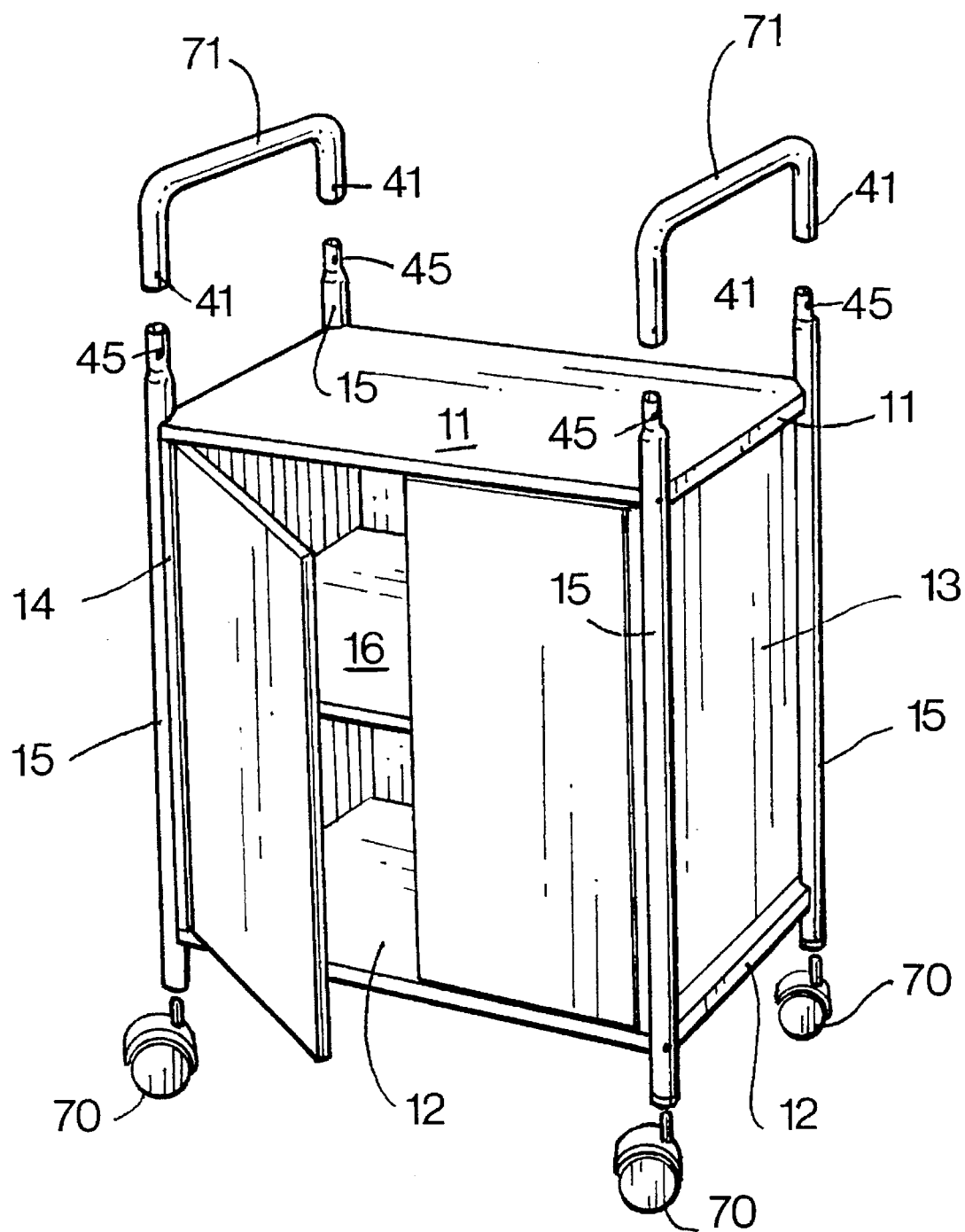
FIG. 2 is an exploded, frontal perspective view of the base cabinet according to FIG. 1 in which casters and a pair of top rails have been added thereto.

Preferably, the cabinet 10 is finished, using such amenities as adjustable interior shelves 16, doors 17, back 18, and feet 19 (FIG. 1). The back 18 is best inserted into a groove (not shown) cut to fit it in the panels 11, 12, 13, 14. Also, the feet 19 may be plastic plugs or caps predrilled to receive casters 70 as shown in FIG. 2. Further, the interior shelves 16 can be placed at varying heights using commonly available hardware such spaced holes drilled part of the way through the side panels 13, 14 and pins to support the shelves placed at desired height intervals. Also a top rail 71 with swaged male fittings slideably insertable into the upper ends of proximate pairs of grooved sections 25 is provided to give the unit a more finished appearance and to prevent articles from falling off the ends of the top shelf 21.

The cabinet 10 and open shelf unit 20 shown in FIG. 1 can, of course, also be used separately as shown in FIG. 2. When the cabinet is to be utilized independently, a top rail 71 is preferably connected to the grooved sections 15 using twist-lock joints (not shown). Once the top rail 71 is in place, assembly of the cabinet 10 proceeds by joining together the panels 11, 12, 13, 14 with dowel pins (not shown) as described hereinabove and then attaching the panels 11, 12 to the grooved sections 15 by the use of joints 50. When the cabinet is to be employed in a mobile cart, casters 70 are inserted into the bottom ends of the grooved sections 15. The cart can be lifted by the top rail 71, if it has been attached.

Figure 3:
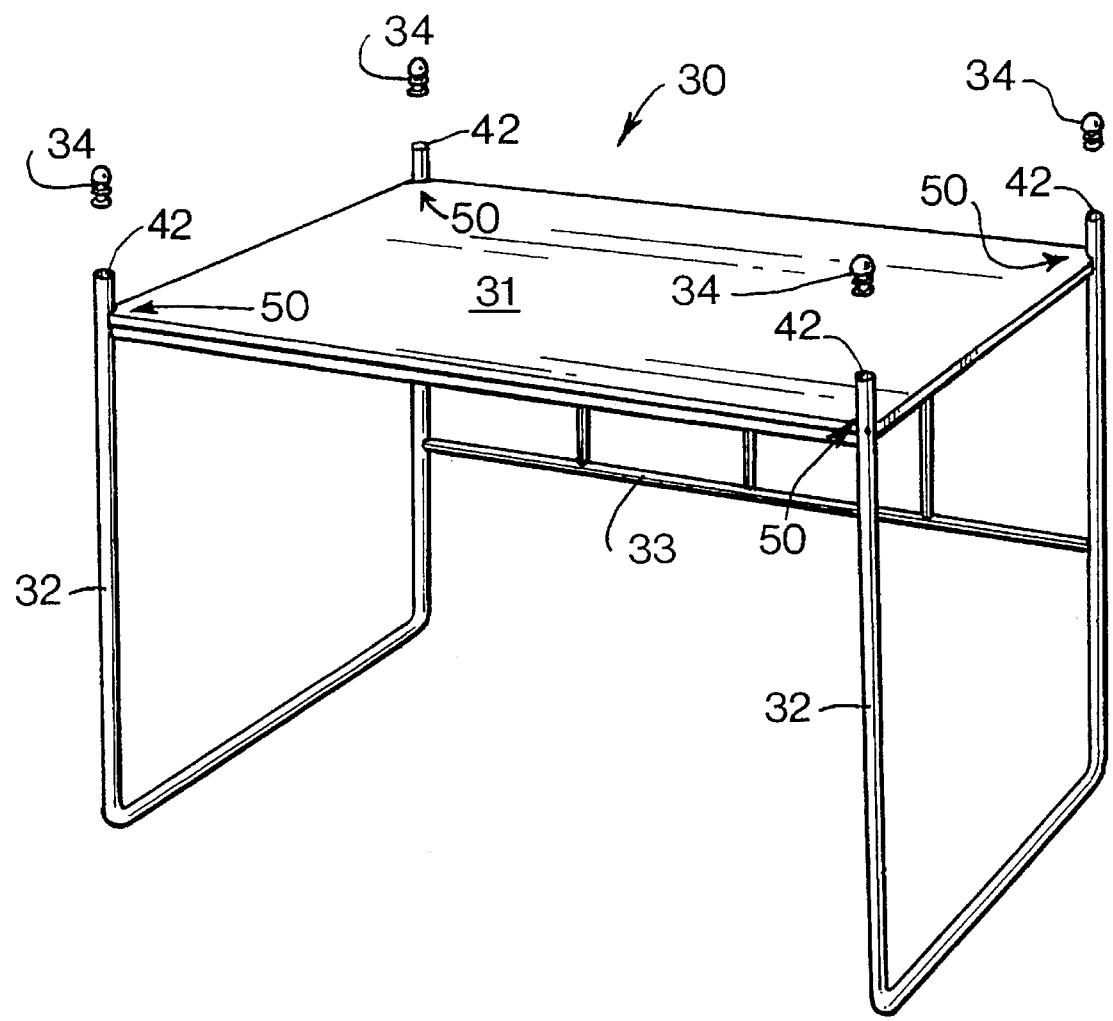
FIG. 3 is an exploded, frontal perspective view of a modular furniture piece used as a desk, the desk exhibiting at least one joint according to the present invention.

In FIG. 3, a modern-looking work table 30, also a piece of modular furniture, includes a rectangular top panel 31 supported by a tubular frame 32, the panel being attached thereto by joints 50. The panel 31 is preferably about ¾ inch thick, and frame is fabricated of 1½ inch diameter tubing. Strengthening the frame 32 is a shear support panel 33 fastened thereto. Plugs 34 installed in top openings 42 of the tubular frame 32 seal off these openings which are otherwise serviceable as elements 41 of twist-lock joints (not shown).

Figure 4:
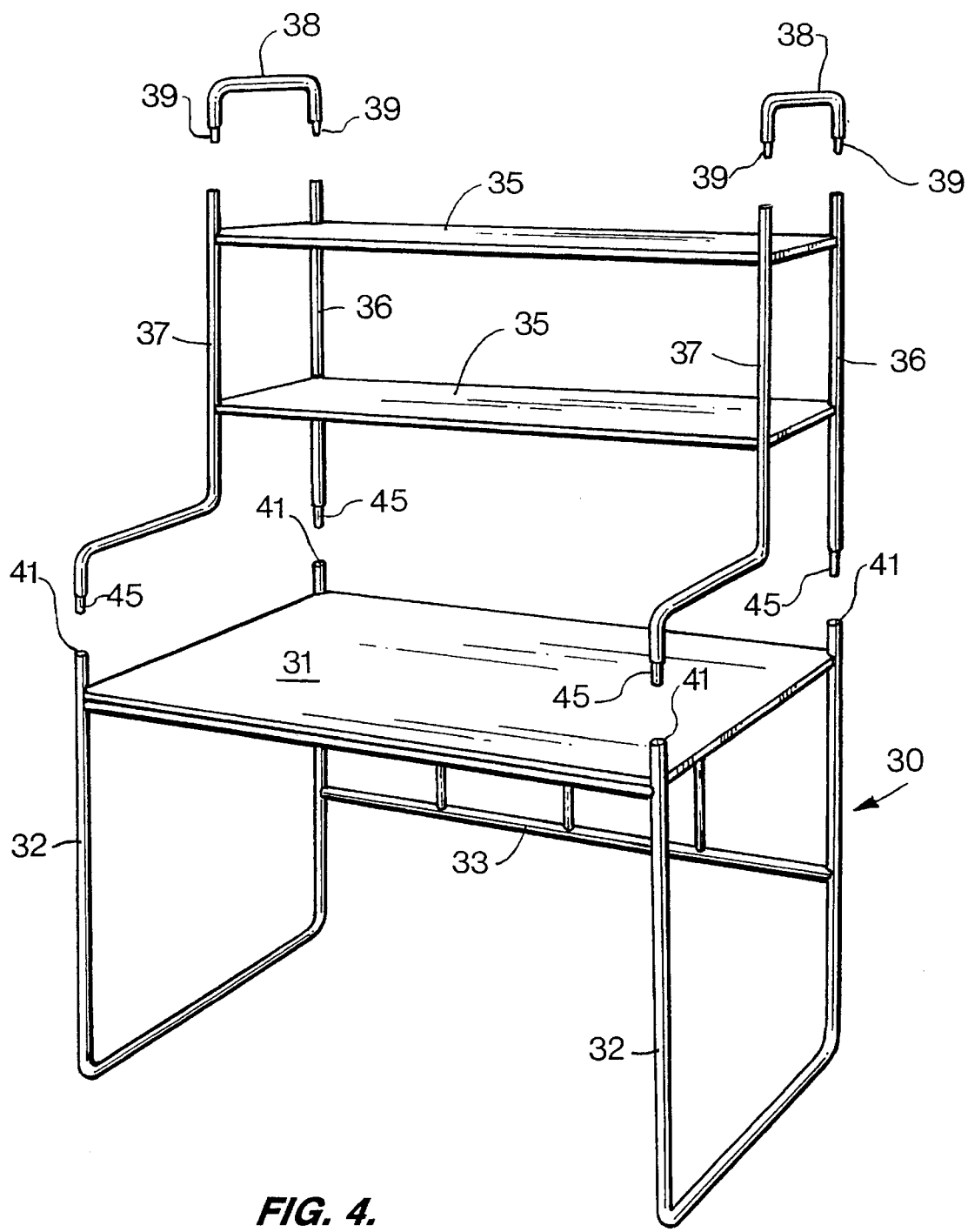
FIG. 4 is an exploded, frontal perspective view of the desk according to FIG. 3 to which an above-desk shelf unit has been added.

A unit with storage shelves 35 can easily be added to the work table 30 (FIG. 4). To assemble this unit, the plugs 34 are removed; and the frame 32 is extended by joining additional frame members 36, 37 using twist-lock joints (not shown). The shelves 35 are then inserted into grooves (not shown) formed in the frame members 36, 37. Once the shelves are inserted into the grooves, fastening screws (not shown) are tightened, forming joints Lastly, a top rail 38 is attached to the frame members 36, 37 using a simple male-female joint 39 to give a more finished appearance and to keep articles from falling off the ends of the top shelf 35 (FIG. 4).

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

What is claimed is:

1. In furniture having at least one horizontally-disposed shelf supported by a frame, wherein the improvement comprises:

(a) the frame having at least one section of elongated tubing, the section having a longitudinal centerline and defining a groove which is disposed transversely to the longitudinal centerline of the tubing and which is approximately as wide as the shelf is thick, portions of the section disposed contiguous with the groove defining opposing distal ends thereof, the ends of the groove being spaced apart from each other by a distance substantially equal in width to the transverse cross-section of the tubing;

(b) the shelf having elongated edges and being generally rectangular in plan view but having at least one truncated corner insertable within the groove, the elongated edges extending away from the truncated corner; and (c) means for rigidly attaching a portion of the section disposed proximate with the groove to the truncated corner when the corner is inserted into the groove, the elongated edges of the shelf being wedged, at points contiguous with the truncated corner, against the distal ends of the groove when the truncated corner is rigidly attached to said portion.

2. The improvement according to claim 1 wherein the portion of the section proximate with the groove rigidly attached to the truncated corner is disposed between the opposing distal ends of the groove.

3. The improvement according to claim 1 wherein the means for rigidly attaching a portion of the section proximate with the groove to the truncated corner further comprises:

(a) said portion of the section defining the opposing distal ends of the groove having a first hole disposed about midway between the opposing distal ends;

(b) the truncated corner defining opposing distal edges spaced apart by a distance slightly less than the distance between the opposing distal ends of the groove, the truncated corner having a second hole disposed about midway between said opposing distal edges; and (c) a screw insertable through the first hole and into the second hole for threadedly engaging the shelf, so that the section of elongated tubing can be rigidly attached to the shelf.

4. In furniture having first and second horizontally-disposed shelves supported by a frame, wherein the improvement comprises:

(a) the frame having first and second vertically-disposed sections of elongated tubing, the first vertically-disposed section having at least one open end and an indentation formed near the open end and the second vertically-disposed section having a swaged tubing part slideably insertable into the first section through the open end thereof, the swaged tubing part defining a narrow, curved channel along which the indentation can travel as the swaged tubing part is slideably inserted into the first section and, once the indentation reaches maximum vertical travel, is twisted within the first section; the first and second sections each having a longitudinal centerline and defining first and second grooves, respectively, each groove being disposed transversely to the respective longitudinal centerline of the section in which the groove is formed;

(b) each of the first and second shelves being generally rectangular in plan view but having at least one first and second truncated corner, respectively;

(c) means for rigidly attaching a portion of the first section proximate with the first groove to the first truncated corner; and (d) means for rigidly attaching a portion of the second section proximate with the second groove to the second truncated corner, the indentation remaining fully engaged with the channel while the first and second truncated corners are rigidly attached to portions of the first and second sections, respectively.

5. In furniture having first and second horizontally-disposed shelves supported by a frame, each of the first and second shelves having at least one first and second truncated corner, respectively, wherein the improvement comprises:

(a) the frame having first and second vertically-disposed sections of elongated tubing, the first and second sections each having a longitudinal centerline and defining first and second grooves, respectively, each groove being disposed transversely to the respective longitudinal centerline of the section in which the groove is formed;

(b) means for vertically aligning the first and second grooves formed in the first and second sections, respectively, the aligning means comprising the first vertically-disposed section having at least one open end and an indentation formed near the open end and the second vertically-disposed section having a swaged tubing part slideably insertable into the first section through the open end thereof, the swaged tubing part defining a narrow, curved channel along which the indentation can travel as the swaged tubing part is slideably inserted into the first section and, once the indentation reaches maximum vertical travel, is twisted, thereby bringing first and second grooves formed in the first and second sections, respectively, into vertical alignment with each other;

(c) means for rigidly attaching a portion of the first section proximate with the first groove to the first truncated corner; and (d) means for rigidly attaching a portion of the second section proximate with the second groove to the second truncated corner.

6. In furniture having first and second horizontally-disposed panels supported by a frame, the horizontally-disposed panels being joined to at least one vertically-disposed panel, wherein the improvement comprises:

(a) the frame having at least one vertically-disposed section of elongated tubing, the section having a longitudinal centerline and defining first and second grooves, each groove being disposed transversely to the longitudinal centerline of the tubing, the first groove being approximately as high as the first horizontally-disposed panel is thick and the second groove being approximately as high as the second horizontally-disposed panel is thick;

(b) each horizontally-disposed panel being generally rectangular in plan view but having at least one truncated corner insertable within the groove;

(c) means for rigidly attaching a portion of the section disposed proximate with the first groove to the truncated corner of the first horizontally-disposed panel when the corner is inserted into the first groove;

(d) means for rigidly attaching a portion of the section disposed proximate with the second groove to the truncated corner of the second horizontally-disposed panel when the corner is inserted into the second groove;

(e) a set of dowel pins; and (f) each panel having closed-end holes formed therein, pairs of closed-end holes formed in each of the horizontally-disposed panels and in the vertically-disposed panel being alignable with each other along junctures between each horizontally-disposed panel and the vertically-disposed panel; each of the pairs of closed-end holes receiving one of the dowel pins, each dowel pin when received in one of said pairs being subjected to a shearing force, locking the dowel pin in place, when a truncated corner disposed proximate with the closed-end hole in the horizontally-disposed panel retaining said dowel pin is rigidly attached to the vertically-disposed section of elongated tubing.

* * * * *